(12) United States Patent
Tiwari

(10) Patent No.: US 11,196,469 B1
(45) Date of Patent: Dec. 7, 2021

(54) OVERLAYING A COVERAGE AREA OF A CELLULAR WIRELESS NETWORK WITH A COVERAGE AREA OF AN ADAPTIVE SECTORIZATION BASE STATION

(71) Applicant: Facebook, Inc., Menlo Park, CA (US)

(72) Inventor: Abhishek Tiwari, Oak Park, CA (US)

(73) Assignee: Facebook, Inc., Menlo Park, CA (US)

( * ) Notice: Subject to any disclaimer, the term of this patent is extended or adjusted under 35 U.S.C. 154(b) by 55 days.

(21) Appl. No.: 16/857,773

(22) Filed: Apr. 24, 2020

(51) Int. Cl.
*H04B 7/04* (2017.01)
*H04B 7/0495* (2017.01)
*H04B 7/155* (2006.01)
*H04B 7/06* (2006.01)
*H04B 7/0408* (2017.01)

(52) U.S. Cl.
CPC ......... *H04B 7/0495* (2013.01); *H04B 7/0408* (2013.01); *H04B 7/0608* (2013.01); *H04B 7/15507* (2013.01)

(58) Field of Classification Search
CPC .. H04B 7/0495; H04B 7/0608; H04B 7/0408; H04B 7/15507
See application file for complete search history.

(56) References Cited

U.S. PATENT DOCUMENTS

| | | | |
|---|---|---|---|
| 8,041,395 B2 * | 10/2011 | Lo | H04W 72/0453 455/562.1 |
| 8,675,537 B2 | 3/2014 | Khandekar et al. | |
| 10,211,662 B2 * | 2/2019 | Stein | H02J 50/20 |
| 2007/0281722 A1 * | 12/2007 | Gao | H04W 72/005 455/518 |
| 2012/0034952 A1 | 2/2012 | Lo et al. | |
| 2017/0237476 A1 * | 8/2017 | Kim | H04B 7/0617 370/329 |

* cited by examiner

*Primary Examiner* — Hashim S Bhatti
(74) *Attorney, Agent, or Firm* — Brian R. Short

(57) ABSTRACT

Apparatuses, methods, and systems for overlaying a coverage area of a cellular wireless network with a coverage area of a sectorization base station are disclosed. One method includes providing, by a plurality of cellular base stations, wireless access to a plurality of wireless devices over a coverage area, providing, by a sectorization base station, wireless communication to the plurality of wireless devices over at least the coverage area, each sector of a plurality of antennas of the sectorization base station operates to cover a selectable coverage area as determined by a width of a beamforming pattern, identifying locations of each of the plurality of wireless devices, and selecting beamforming parameters of the beamforming pattern based at least on the locations of the plurality of wireless devices, wherein the selected beamforming parameters control at least a sector selection and the width of the beamforming pattern of the sector.

18 Claims, 7 Drawing Sheets

Standard Base Station
Cell Deployment

Super Cell
(Sectorization) Base
Station Deployment

Providing, by a plurality of cellular base stations, wireless access to a plurality of wireless devices over a coverage area

710

Providing, by a supercell base station, wireless communication to the plurality of wireless devices over at least the coverage area, wherein the supercell base station comprises a plurality of antennas operating to form a plurality of sectors, wherein each sector of the plurality of antennas operates to cover a selectable coverage area as determined by a width of a beamforming pattern formed by a subset of the plurality of antennas of the sector

720

Identifying locations of each of the plurality of wireless devices

730

Selecting beamforming parameters of the beamforming pattern based at least on the locations of the plurality of wireless devices, wherein the selected beamforming parameters control at least a sector selection and the width of the beamforming pattern of the sector

OVERLAYING A COVERAGE AREA OF A CELLULAR WIRELESS NETWORK WITH A COVERAGE AREA OF AN ADAPTIVE SECTORIZATION BASE STATION

FIELD OF THE DESCRIBED EMBODIMENTS

The described embodiments relate generally to wireless communications. More particularly, the described embodiments relate to systems, methods and apparatuses for overlaying the coverage area of a cellular wireless network with the coverage area of an adaptive sectorization wireless base station for efficient handling of broadcast traffic.

BACKGROUND

In large emerging markets (India, Brazil, Indonesia, Nigeria etc.), video content consumption is primarily on mobile devices.

The video delivery performance (overall not just live videos) of several of the emerging market MNOs (mobile network operators) in Asia, South America and Africa is considered substandard. Live event streaming creates stress on resource constrained mobility networks of MNOs particularly when a large number of users are concurrently consuming live content.

Most internet traffic is of unicast nature. For this reason most cellular networks are architected to optimize for unicast traffic. Live streaming traffic is multicast or broadcast in nature. It is inefficient to use cellular networks designed for unicast traffic for broadcast or multicast traffic. The problem gets worse when a large number of users subscribe to the same live content. This results in packets containing the same information flooding the network. With a recent surge in live event streaming on mobile phones it is desirable to find methods, apparatus and systems to optimize the delivery of broadcast or multicast content over cellular networks that were originally built for unicast traffic.

It is desirable to have methods, apparatuses, and systems for overlaying the coverage area of a cellular wireless network with the coverage area of an adaptive sectorization wireless base station.

SUMMARY

An embodiment includes a method. The method includes providing, by a plurality of cellular base stations, wireless access to a plurality of wireless devices over a coverage area, providing, by a sectorization base station, wireless communication to the plurality of wireless devices over at least the coverage area, wherein the sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector, identifying locations of each of the plurality of wireless devices, and selecting beamforming parameters of the beamforming pattern based at least on the locations of the plurality of wireless devices, wherein the selected beamforming parameters control at least a sector selection and the width of the beamforming pattern of the sector.

Another embodiment includes a network. The network includes a plurality of cellular base stations providing wireless access for a plurality of wireless devices over a coverage area, a sectorization base station providing wireless communication to the plurality of wireless devices over at least the coverage area, wherein the sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector, and a controller. The controller is operative to identify locations of each of the plurality of wireless devices, and select beamforming parameters of the beamforming pattern based at least on the locations of the plurality of wireless devices, wherein the selected beamforming parameters control at least a sector selection and the width of the beamforming pattern of the sector.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 is a flow chart that includes steps of a method of overlaying a coverage area of an adaptive sectorization wireless base station with a coverage area of a cellular wireless network, according to an embodiment.

DETAILED DESCRIPTION

The embodiments described include methods, apparatuses, and systems for overlaying a coverage area of a cellular wireless network with a coverage area of adaptive sectorization wireless base stations. For an embodiment, this includes overlaying a coverage area of an existing cellular network with a coverage area of a network formed by an adaptive sectorization wireless base station. For an embodiment, broadcast or multicast traffic is routed to a network of the adaptive sectorization wireless base station while the underlying cellular network continues delivering unicast traffic. For an embodiment, the adaptive sectorization at multiple broadcast base stations enables a single frequency (single carrier frequency) network footprint to be adaptively configured on a per stream basis depending on locations of subscribers of continuous (for example, live) streams of data traffic. For an embodiment, unicast traffic or transmission is from a single transmitter (single node) to a single receiver (single node). For an embodiment, broadcast or multicast traffic or transmission is from a single transmitter (single node) to multiple receivers (multiple nodes).

For at least some embodiments, the wireless sectorization base station includes a plurality of antennas, wherein a plurality of subsets of the plurality of antennas operates to form a plurality of sectors. For an embodiment, each sector of each subset of the plurality of antennas is operative to cover a selectable coverage area as determined by a width of a beamforming pattern formed by the subset of the plurality of antennas of the sector. The width and direction of the beamforming pattern can be selected by selecting beamforming parameters of the subset of the plurality of antennas. The beamforming parameters can include phases and amplitude adjustments of signals being communicated through the formed beams of the sectors.

Figure 1:
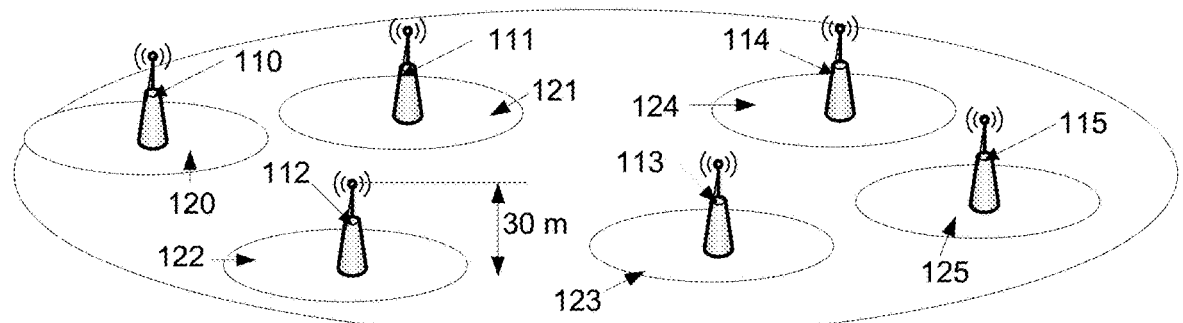
FIG. 1 shows a conventional base station tower and a sectorization base station tower, according to an embodiment.
Figure 1:
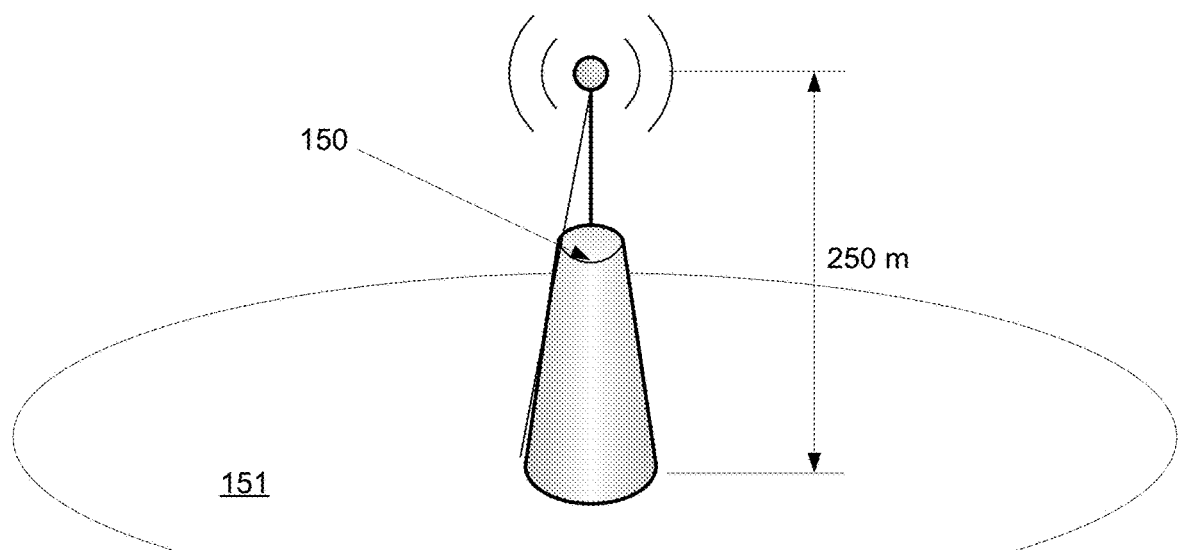

FIG. 1 shows conventional base station towers and a sectorization base station tower, according to an embodiment. For an embodiment, the standard base stations 110, 111, 112, 113, 114, 115, have a height, and therefore, an antenna elevation of about 30-60 meters. Further, each of the standard base stations have a cell coverage area 120, 121, 122, 123, 124, 125.

FIG. 1 also shows a super cell (sectorization) base station tower 150 that has a coverage area 151. Elevating base stations to greater heights above ground and by using the high gain of narrow beam width sectors provides improved propagation (ranges of 20-75 km) and presents an opportunity to reduce the total cost of ownership for the network infrastructure operator by deploying fewer elevated base stations to cover the same area. Further, improved propagation (coverage) range provided by an elevated base station requires the base station to serve greater capacity to satisfy the demand. For an embodiment, the sectorization base stations have a greater height than the cellular base stations.

For greater capacity, the greater spectral efficiency of the elevated base station 150 is needed since available spectrum is unlikely to change. Techniques such as Massive MIMO (multiple-input, multiple-output), MU-MIMO (multi-user, MIMO) and high order sectorization have been used to improve spectral efficiency. However, the performance of Massive MIMO and MU-MIMO techniques depend greatly on having good quality channel state feedback available at the base station. To obtain the channel state information, channel state estimation preambles are transmitted without the beamforming gain of MU-MIMO through an omni-directional antenna. However, this means that the propagation range of the base station is fundamentally limited by the range of omni-directional transmission of channel state preambles. Further, the capacity gains of highly sectorized base stations are greatly diluted if the base station is mounted on a standard height tower. The dilution is due to local clutter around the tower which creates a large angular spread resulting in significant inter-sector interference between sectors.

Deployment of tall (supercell) base stations is advantageous because cellular propagation models predict ~6 dB (rule of thumb) lower path loss upon each doubling of base station height. Further, for an embodiment, as the base station height is increase, the clutter if angular spread of wireless signals decreases. The reduction in the amount of clutter of the angular spread of communication signals can make adaptive sectoring possible as oppose to a short (lower height) base station that typically suffer from too much cluster of the angular spread of communication signals to allow for adaptive sectoring.

For at least some embodiments, the tall base stations form super cells that are much larger than cells formed by standard cellular networks. For an embodiment, high-order sectoring can be provided by a Luneburg lens antenna array. Further, for an embodiment, the antenna array includes a high-power amplifier array. Further, base band processing of the base station can be located at a lower elevation than the antenna array of the base station, and communication signals and power can be provided to the antenna array through a fiber. Further, the described embodiments of sectorization can be waveform agnostic and allow the wireless base station to support wireless communication standards that do not utilize channel state information.

Figure 2:
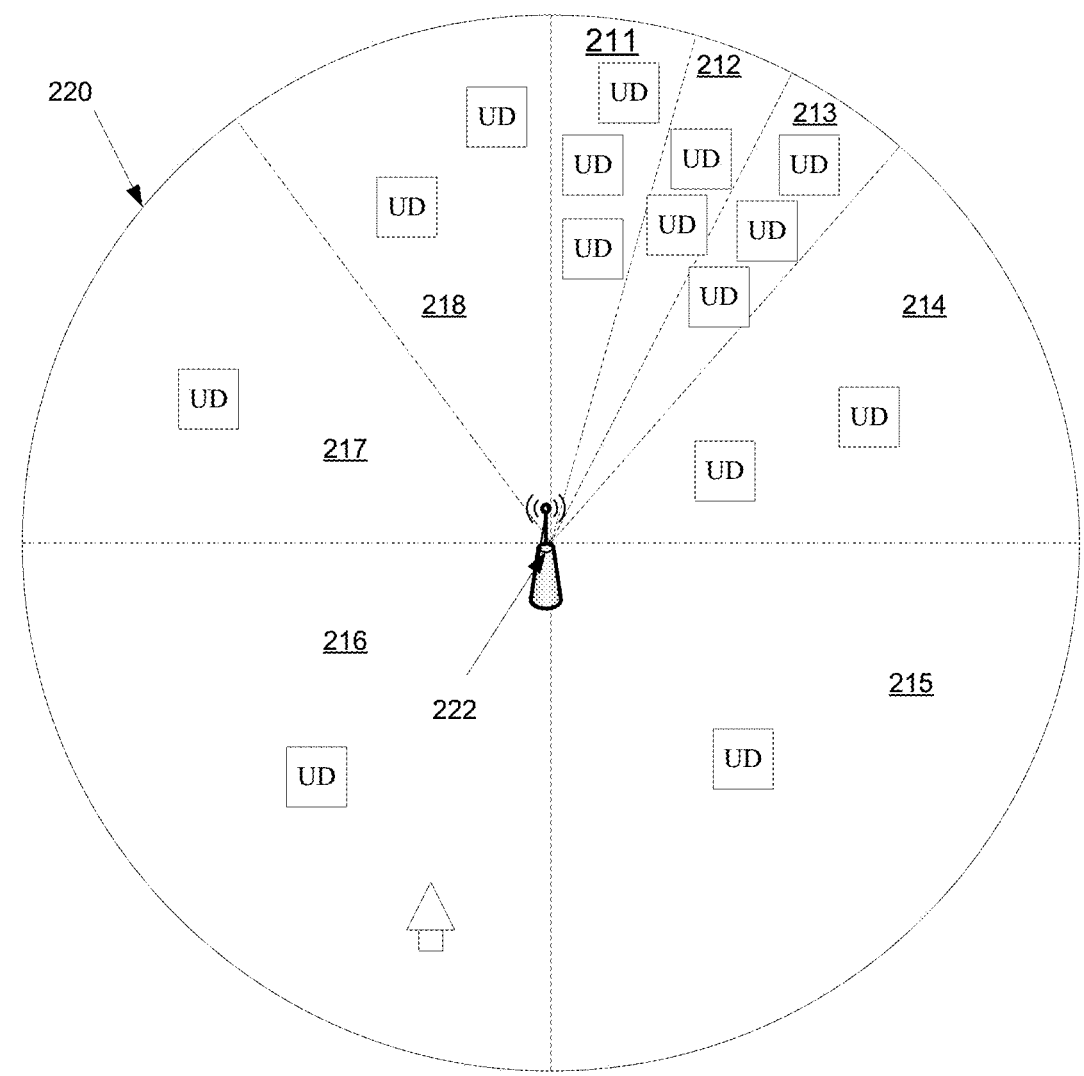
FIG. 2 shows a cell of a base station that includes adaptive sectoring, according to an embodiment.

FIG. 2 shows a cell of a sectorization base station 222 that includes adaptive sectoring, according to an embodiment. As shown, the coverage area 220 of the sectorization base station 222 is divided into sectors 211, 212, 213, 214, 215, 216, 217, 218 wherein each sector covers a section of the total coverage area 220 of cell of the base station 222. Generally, for an embodiment, each sector includes a radio and an array of antennas that operate to form a beam in which wireless signals can be transmitted and/or received from wireless devices. For an embodiment, the width of the beam is directly related to the gain of the sector beam and therefore to the coverage area of the sector.

For an embodiment, the coverage area of the different sectors varies. Further, for an embodiment, the coverage (or sectorization) of each of the sectors is adaptively adjusted over time. For an embodiment, the selectable coverage area of each of the sectors is adaptively selected based on monitoring of the data demand with respect to location over time. That is, for a given sector, the data being demanded (uplink or downlink) is monitored and the coverage area is accordingly adjusted. That is, the greater the data demand, the more focused or narrower the sector, to allow the sector to satisfy the data demand. For an embodiment, the data demand is estimated or determined at different locations (azimuth and elevation angles) within the coverage area of the cell (Supercell) formed by the base station. After the adaptation of the sectors has been performed, the azimuth and elevation angles with higher data demand will have a greater number of narrow sectors. Further, the sectors with azimuth and elevation angles having a lower data demand will have a fewer number of wider sectors serving them.

As previously described, in order to implement adaptive sectoring, the coverage area of the base station must be subjected to angular spread of wireless communication signals within the coverage area of less than a threshold amount. Taller base stations can be implemented that are above the clutter (that decreases the angular spread of wireless communication signals) within the coverage area, and therefore, can implement adaptive sectoring which is not implementable with shorter, standard cell base stations.

For an embodiment, the selectable coverage area of each of the sectors is adaptively selected further based on a number of users (shown, for example, as user devices (UD in FIG. 2) located within the sector. That is, in general, the number of users within a sector can be used as an indication of the data demand of the sectors. Further, for an embodiment, the selectable coverage area of each of the sectors is adaptively selected further based on monitored performance that indicates a refined estimate of the number of users located within the sector. That is, an estimate of the number of users within a sector can be improved by monitoring activity within the sector.

The adaptive sectoring of the described embodiments can provide for greater capacity of wireless communication by the base station. Inter-sector interference can operate to limit the capacity gains realized by adaptive sectoring, however, reusing of carrier frequencies across different sectors can increase the inter-sector interference. One way to reduce interference is by using different carrier frequencies in neighboring sectors. However, this comes at a cost of lower deliverable overall capacity. Tall towers of sectorization base stations provide lower observable angular spread than shorter base stations which reduces inter-sector interference and enables frequency reuse in all sectors and thus the overall capacity of Supercell is enhanced. Further, adaptive sectors include narrow sectors as facilitated by narrow sector beam widths that result in higher (additional) antenna gains which further improves coverage.

As described, for at least some embodiments, the coverage areas of the sectors can be adaptively selected based on data demand and numbers of users. That is, for example, sectors can be adapted to a user population and a user data demand. For an embodiment, azimuth directions that experience more demand are served a large number of narrow sectors. For an embodiment, azimuth directions that have low demand are served by a small number of wide sectors. For an embodiment, as demand changes the sectorization allocations adapt to the demand changes based on network key performance indices.

Figure 3:
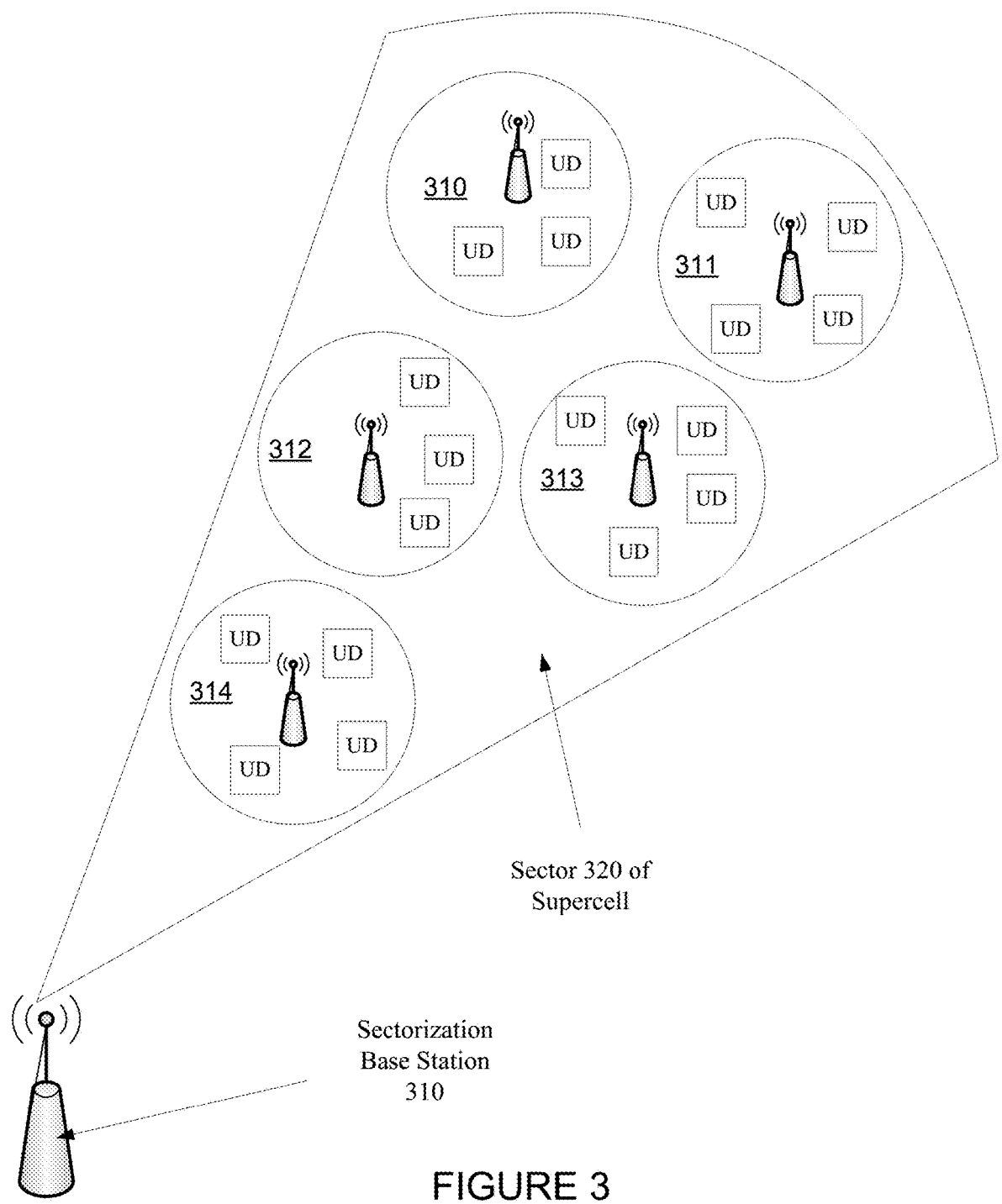
FIG. 3 shows a sector of a sectorization base station in which a coverage of the sector overlays coverage areas of multiple cells of a standard cellular network, according to an embodiment.

FIG. 3 shows a sector 320 of a sectorization base station 310 in which a coverage of the sector 320 overlays coverage areas of multiple cells 310, 311, 312, 313, 314 of a standard cellular network, according to an embodiment. As shown, the user devices (UD) are provided with wireless coverage by both cellular base stations of the wireless cells 310, 311, 312, 313, 314, and by the sector 320 of a supercell formed by the sectorization base station 310. Accordingly, each of the user devices (UDs) can wirelessly communicate with the cellular base stations of the wireless cells 310, 311, 312, 313, 314, and/or with the sector 320 of the supercell.

For at least some embodiments, beamforming parameters of the beamforming pattern of the sector 320 are selected based at least on the locations of the plurality of wireless devices, wherein the selected beamforming parameters control at least a sector selection and the width of the beamforming pattern of the sector. That is, activation (selection) of the sector 320 and the width of the sector 320 are controlled by the beamforming parameters of the sector 320. That is, broadcast coverage area of the sector 320 is controlled by the beamforming parameters which can include, for example, the selection of phase and amplitude of signals being communicated through the multiple antennas of the sectorization base station of the sector 320.

For at least some embodiments, the user devices (UDs) operate to simultaneously receive broadcast coverage through the sector 320 and unicast coverage from the base stations of the wireless cells 310, 311, 312, 313, 314. For an embodiment, the simultaneous coverage enables communicating live streams of data to many user devices (UDs) which is substantially more efficient than cellular unicast of the live streams by only the base stations of the wireless cells 310, 311, 312, 313, 314. This efficiency comes due to (1) efficient usage of spectrum resources (that is, sending broadcast data only once instead of sending the same data to different UDs as unicast traffic), (2) efficient usage of the backhaul (3) efficient usage of fixed content delivery networks etc.

For at least some embodiment, beam coefficients of the supercell sector are selected based at least in part of the locations of the user devices. For an embodiment, the locations of the user devices (UDs) can be determined from each user device (for example, one or more of the user devices may include a GPS (global positioning system) receiver for determining the location of the user device). For an embodiment, the location of the user devices can be estimated based on which base station of the wireless cells 310, 311, 312, 313, 314 the user device is wirelessly connected.

Generally, for at least some embodiments, the plurality of cellular base stations (such as the base stations of the wireless cells 310, 311, 312, 313, 314) provide wireless access to a plurality of wireless devices (such as, the user devices UDs of FIG. 3) over a coverage area. The sectorization base station (such as, the supercell of the sector 320) provides wireless communication to the plurality of wireless devices over at least the coverage area, wherein the sectorization base station includes a plurality of antennas operating to form a plurality of sectors, wherein each sector of the plurality of antennas operates to cover a selectable coverage area as determined by a width of a beamforming pattern formed by a subset of the plurality of antennas of the sector. Locations of each of the plurality of wireless devices are identified. Beamforming parameters of the beamforming pattern are selected based at least on the locations of the plurality of wireless devices, wherein the selected beamforming parameters control at least a sector selection and the width of the beamforming pattern of the sector.

For at least some embodiments, the sectorization base station broadcasts streaming data through the selected sector of the sectorization base station. For an embodiment, the streaming data includes live streams of data. For at least some embodiments, at least one of the plurality of wireless devices simultaneously maintains a unicast wireless link with at least one of the plurality of cellular base stations and receives the broadcast streaming data through the selected sector of the sectorization base station.

At least some embodiments further include advertising by at least one of the cellular base stations or by the sectorization base station, availability of the streaming data. At least some embodiments further include receiving, by at least one of the cellular base stations, a selection from one of more of the plurality of wireless devices to receive the streaming data. At least some embodiments further include selecting beamforming parameters of the beamforming pattern based which of the plurality of wireless devices selects to receive the streaming data.

As previously described, at least some embodiments include identifying a location of one or more of the plurality of wireless devices based on which of the plurality of cellular base stations the one or more of the plurality of wireless devices is maintaining a wireless link.

For an embodiment, a supercell (sectorization) base station operates to provide a multimedia broadcast multicast service in an around, for example, a live event in a stadium. Supplementing an existing unicast cellular network with the broadcast service of the sectorization base station provides improved quality and optimizing for live instant replay delivery on mobile devices (user devices).

Figure 4:
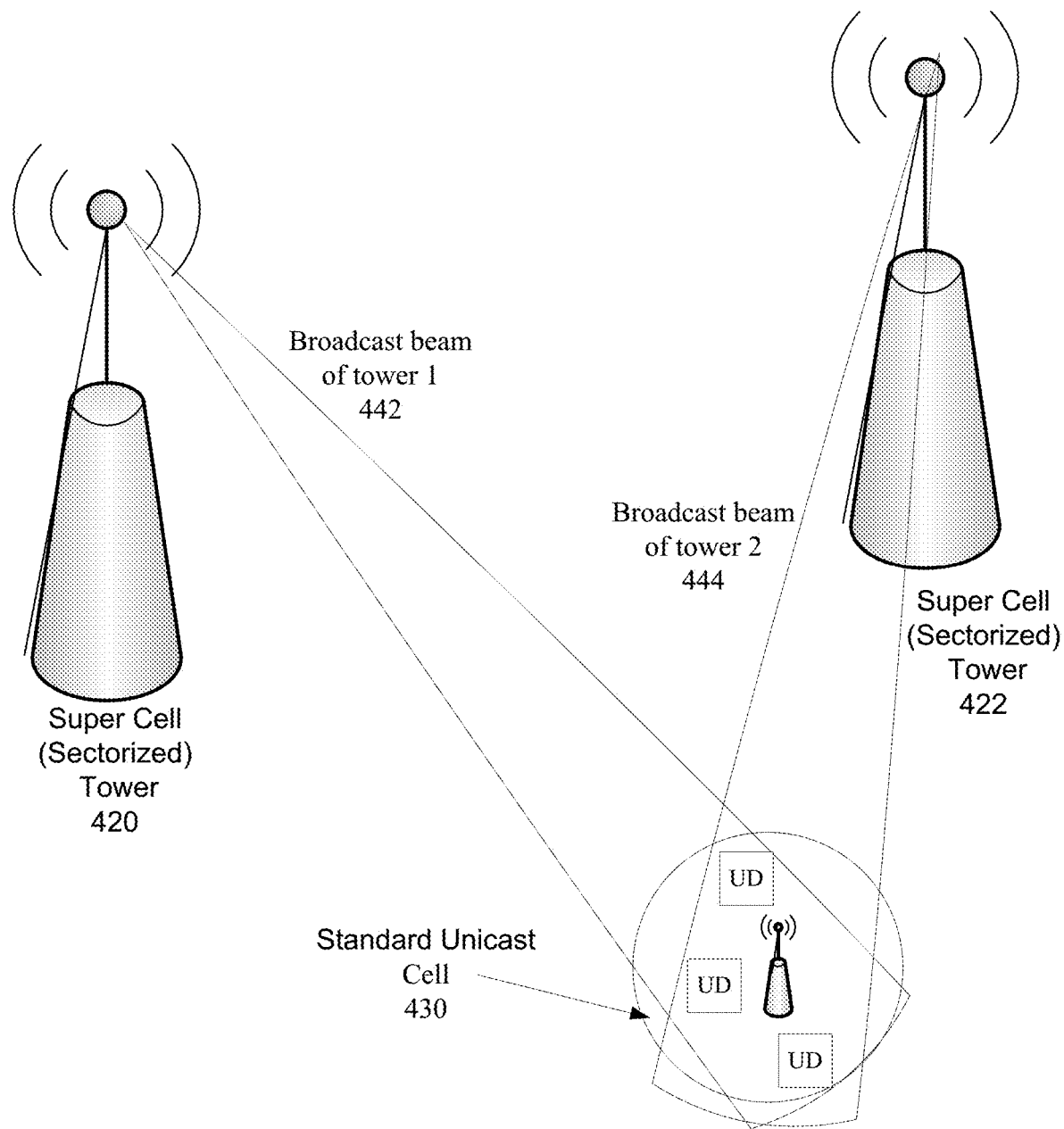
FIG. 4 shows a broadcast beam of a first sectorization base station and a broadcast beam of a second sectorization base station overlaying a standard unicast cell, according to an embodiment.

FIG. 4 shows a broadcast beam 442 of a first sectorization base station 420 and a broadcast beam 444 of a second sectorization base station 422 overlaying a standard unicast cell 430, according to an embodiment. At least some embodiments further include the second sectorization base station 422 providing wireless communication to at least one of the plurality of wireless devices (UDs), wherein the second sectorization base station 422 includes a plurality of antennas operating to form a plurality of sectors, wherein each sector of the plurality of antennas operates to cover a selectable coverage area as determined by a width of a beamforming pattern formed by a subset of the plurality of antennas of the sector. Further, like the first sectorization base station 420, a location of each of at least one of the plurality of wireless devices is identified. Further, beamforming parameters of the beamforming pattern are selected based at least on the location of the at least one of the plurality of wireless devices, wherein the selected beamforming parameters control at least a sector selection and the width of the beamforming pattern of the sector of the second sectorization base station 422.

At least some embodiments further include broadcasting, by the second sectorization base station 422, streaming data through the selected sector of the second sectorization base station 422. Further, at least one of the plurality of wireless devices (UDs) simultaneously maintains a unicast wireless link with at least one of the plurality of cellular base stations, and receives the broadcast streaming data through the selected sector of the first sectorization base station 420 and receives the broadcast streaming data through the selected sector of the second sectorization base station 422. For an embodiment, the multiple adaptive sectorization base stations 420, 422 are time synchronized, and operate to transmit the same broadcast stream to the UDs. This results in the UD receiving an improved signal to noise and interference ratio (SINR) of the broadcast stream. For an embodiment, the network (plurality) of adaptive sectorization base stations form a single frequency network (SFN). For an embodiment, the UD is able to combine the same signal transmitted by the multiple adaptive sectorization base stations in the same way as if they (the received signals) are multi-path reflected components of transmissions from the same base station. For an embodiment, the SFN includes a network of base stations that transmit the same signal using the same time (simultaneously) and same spectrum (range of carrier frequencies) resources.

Figure 5:
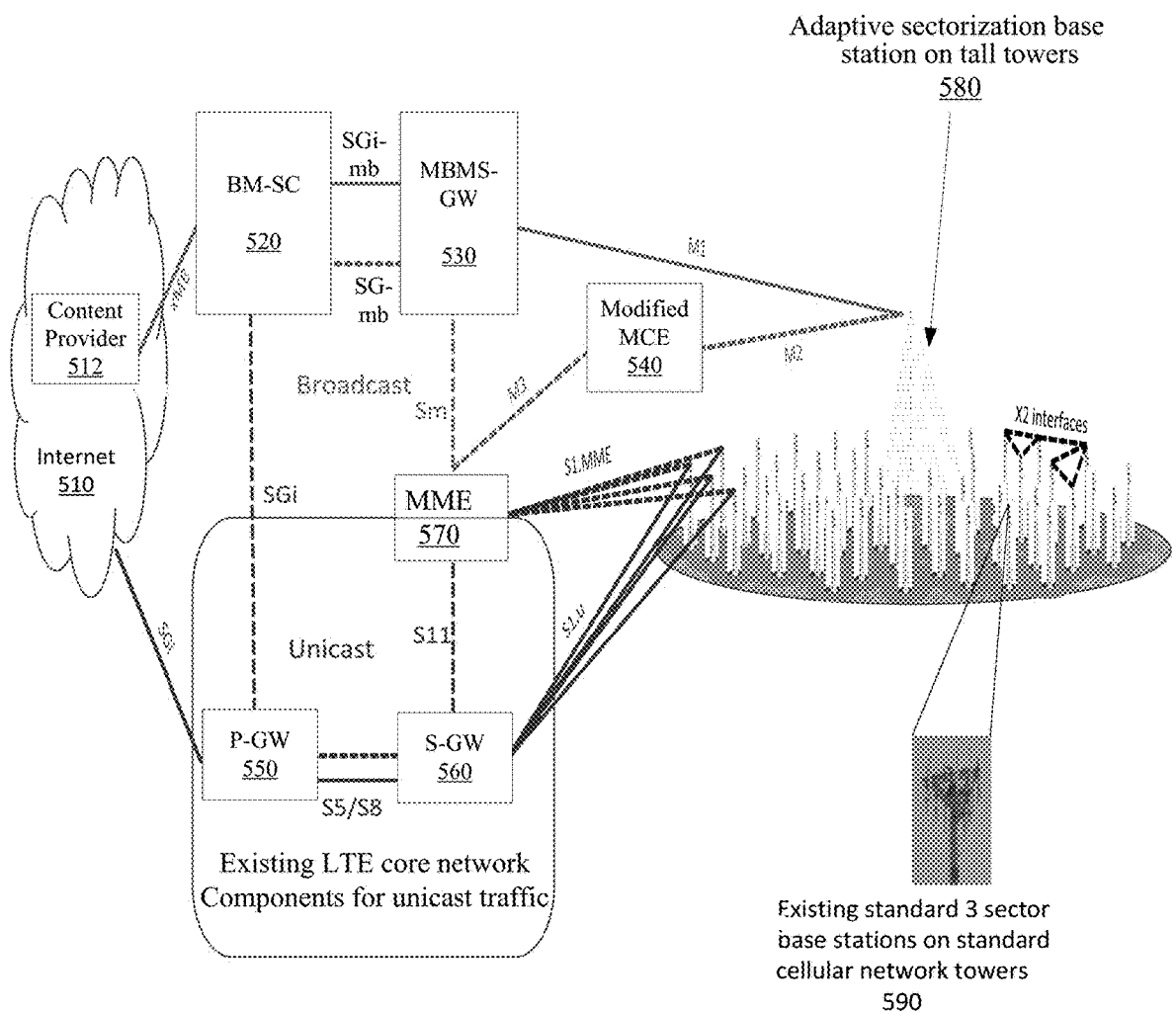
FIG. 5 shows a logical architecture wireless system that includes a broadcast beam of a sector of a sectorization base station overlaying a coverage area of standard unicast cells, according to an embodiment.

FIG. 5 shows a logical architecture wireless system that includes a broadcast beam of a supercell sector overlaying a coverage area of standard unicast cells 590, according to an embodiment. The logical architecture controls the wireless broadcast of streaming data of the supercell sector of an adaptive sectorization base station 580 simultaneous with the wireless unicast of data from the cellular network towers 590. This architecture demonstrates how an existing cellular network (such as, an existing LTE (long term evolution) network) can be supplemented with a sectorization base station 580 to provide enhanced streaming data to users of the existing cellular network.

As shown, for an embodiment, a service provider 512 provides steaming data for user devices connected to both the supercell sector of the adaptive sectorization base station 580 and one or more of the cellular network towers 590.

For an embodiment, a BM-SC (Broadcast Multicast Service Center) 520 includes a software component that acts as an interface between content providers (such as, content provider 512) and a core of the cellular network (such as, cellular network towers 590). For an embodiment, the BM-SC 520 controls an overall evolved Multimedia Broadcast Multicast Services (eMBMS)

For an embodiment, a MBMS-GW (Multimedia Broadcast Multicast Services-Gateway) 530 sends/broadcast MBMS packets to each adaptive sectorization base stations (such as, sectorization base station 580) transmitting the broadcast service. For an embodiment, the MBMS-GW 530 uses IP multicast as the means of forwarding MBMS user data to the adaptive sectorization base stations.

For an embodiment, a modified MCE (Multicast Coordination Entity) 540 Multicasts coordination entity serves one or more adaptive sectorization base stations. A standard MCE uses UD location and broadcast stream subscription information to coordinate the spectrum and time resources at multiple broadcasting base stations such that SFNs can be formed. According to at least some embodiments, the modified MCE 540 additionally coordinates beamforming coefficients (spatial resources) at multiple broadcasting base stations with adaptive sectorization capability. For an embodiment, the modified MCE 540 coordinates radio resources and beamforming coefficients of the multiple adaptive sectorization base stations it serves to be able to create stream adaptive MBSFN (MBMS Single Frequency Network) areas.

The latest LTE standards such as the Further evolved Multimedia Broadcast Multicast Services (FeMBMS) allow for larger cyclic prefix (up to 200 us). The larger cyclic prefix allows base stations separated by larger distances (such as, 60 kms) to form an SFN. The described embodiments utilize the larger cyclic prefix to allows large coverage adaptive sectorization base stations on tall towers to form SFNs. For an embodiment, a cyclic prefix is created to prevent intersymbol interference (ISI) when an OFDM (orthogonal frequency division multiplexing) signal is transmitted in a dispersive channel. For an embodiment, the cyclic prefix includes identical copy of the last portion of the OFDM symbol appended before the OFDM symbol. At least some of the described embodiments include the wireless communication from the adaptive sectorization base station(s), wherein the wireless communication including OFDM symbols, wherein a cyclic prefix is appended to the OFDM symbol having a time duration long enough to support wireless communication from the adaptive sectorization base station(s) over a desired range (distance).

For an embodiment, a MME (Mobility Management Entity) 570 is part of any LTE (long term evolution) cellular network core. For an embodiment, the MME 570 retains location information at a tracking area level for each UE (user device UD). For an embodiment, the MME 570 plays a vital role in handover signaling, roaming etc. For an embodiment, the MCE 540 works closely with MME 570 to keep track of UE (user device UD) movement.

For an embodiment, a S-GW (Server Gateway) 560 provides functionality for uncast wireless data as described, for example, by the 3GPP standard.

For an embodiment, a P-GW (Packet Gateway) provides functionality for unicast wireless data as described, for example, by the 3GPP standard.

Figure 6:
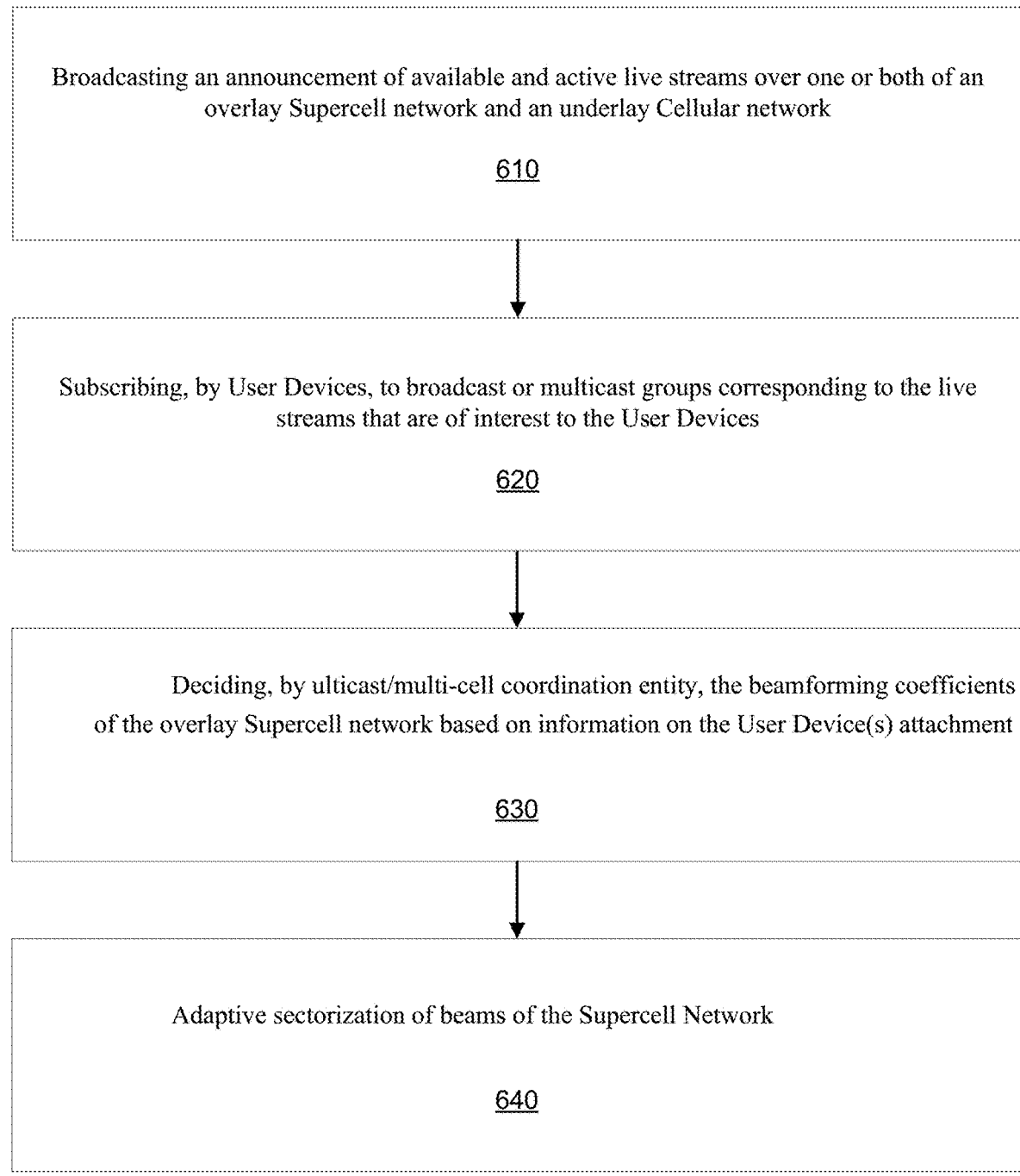
FIG. 6 is a flow chart that includes steps of allowing use devices to subscribe to available and active live streams, according to an embodiment.

FIG. 6 is a flow chart that includes steps of allowing use devices to subscribe to available and active live streams, according to an embodiment. A first step 610 includes broadcasting an announcement of available and active live streams over one or both of an overlay Supercell network and an underlay Cellular network. This can include an announcement of available live streaming services at any given time happens through omni-directional transmission or uniform sectorization scheme from the overlay sectorization base station. Alternatively, or additionally, the same announcement is also broadcast from the underlay cellular network.

A second step 620 includes subscribing, by User Devices, to broadcast or multicast groups corresponding to the live streams that are of interest to the User Devices. This can include UE's joining multicast groups corresponding to the different ongoing live streams in the network. For an embodiment, the sectorized base stations have access to the information on which cells of the underlay network that the interested UEs are attached to.

A third step 630 includes deciding, by unicast/multi-cell coordination entity, the beamforming coefficients of the overlay Supercell network based on information on the User Device(s) attachment.

Using information on UEs subscription to ongoing broadcast streams and information on their attachment to the cells of the underlay network the sectorized base stations are able to create separate multimedia broadcast multicast services areas for different live streams using the adaptive sectorization.

A fourth step 640 includes adaptive sectorization of beams of the Supercell Network.

FIG. 7 is a flow chart that includes steps of a method of overlaying a coverage area of an adaptive sectorization wireless base station with a coverage area of a cellular wireless network, according to an embodiment. A first step 710 includes providing, by a plurality of cellular base stations, wireless access to a plurality of wireless devices over a coverage area. A second step 720 includes providing, by a sectorization base station, wireless communication to the plurality of wireless devices over at least the coverage area, wherein the sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector. A third step 730 includes identifying locations of each of the plurality of wireless devices. A fourth step 740 includes selecting beamforming parameters of the beamforming pattern based at least on the locations of the plurality of wireless devices, wherein the selected beamforming parameters control at least a sector selection and the width of the beamforming pattern of the sector.

As previously described, an embodiment further includes broadcasting, by the sectorization base station, streaming data through the selected sector of the sectorization base station. For an embodiment, the streaming data includes live streams of data.

As previously described, for an embodiment further at least one of the plurality of wireless devices simultaneously maintains a unicast wireless link with at least one of the plurality of cellular base stations and receives the broadcast streaming data through the selected sector of the sectorization base station. An embodiment further includes advertising, by at least one of the cellular base stations or by the sectorization base station, availability of the streaming data. An embodiment further includes receiving, by at least one of the cellular base stations, a selection from one of more of the plurality of wireless devices to receive the streaming data. For an embodiment, selecting beamforming parameters of the beamforming pattern is further based which of the plurality of wireless devices selects to receive the streaming data.

As previously described, at least some embodiments further include identifying a location of one or more of the plurality of wireless devices based on which of the plurality of cellular base stations the one or more of the plurality of wireless devices is maintaining a wireless link. As previously described, the locations of the wireless devices (user devices (UDs)) can be determined from each wireless device (for example, one or more of the wireless devices may include a GPS (global positioning system) receiver for determining the location of the user device), or the locations of the wireless devices can be estimated based on which cellular base stations the wireless device is wirelessly connected.

As previously described, at least some embodiments further include providing, by a second sectorization base station, wireless communication to at least one of the plurality of wireless devices, wherein the second sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector, identifying a location of each of at least one of the plurality of wireless devices, and selecting beamforming parameters of the beamforming pattern based at least on the location of the at least one of the plurality of wireless devices, wherein the selected beamforming parameters control at least a sector selection and the width of the beamforming pattern of the sector of the second sectorization base station.

As previously described, at least some embodiments further include broadcasting, by the second sectorization base station, streaming data through the selected sector of the sectorization base station. As previously described, at least some embodiments further include the at least one of the plurality of wireless devices simultaneously maintains a unicast wireless link with at least one of the plurality of cellular base stations, and receives the broadcast streaming data through the selected sector of the sectorization base station and receives the broadcast streaming data through the selected sector of the second sectorization base station.

Although specific embodiments have been described and illustrated, the embodiments are not to be limited to the specific forms or arrangements of parts so described and illustrated. The described embodiments are to only be limited by the claims.

What is claimed:

1. A method comprising:
   providing, by a plurality of cellular base stations, wireless access to a plurality of wireless devices over a coverage area;
   providing, by a sectorization base station, wireless communication to the plurality of wireless devices over at least the coverage area, wherein the sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector;
   identifying locations of each of the plurality of wireless devices; and
   selecting beamforming parameters of the beamforming pattern based at least on the locations of the plurality of wireless devices and based on which of the plurality of wireless devices select to receive streaming data through the beamforming pattern, wherein the selected beamforming parameters control at least a sector selection and the width of the beamforming pattern of the sector.

2. The method of claim 1, further comprising:
   broadcasting, by the sectorization base station, the streaming data through a selected sector of the sectorization base station.

3. The method of claim 1, further comprising identifying a location of one or more of the plurality of wireless devices based on which of the plurality of cellular base stations the one or more of the plurality of wireless devices is maintaining a wireless link.

4. The method of claim 2, wherein at least one of the plurality of wireless devices simultaneously maintains a unicast wireless link with at least one of the plurality of cellular base stations and receives the broadcast streaming data through the selected sector of the sectorization base station.

5. The method of claim 2, further comprising advertising, by at least one of the cellular base stations or by the sectorization base station, availability of the streaming data.

6. The method of claim 5, further comprising receiving, by at least one of the cellular base stations, the selection from one of more of the plurality of wireless devices to receive the streaming data.

7. The method of claim 1, further comprising:
providing, by a second sectorization base station, wireless communication to at least one of the plurality of wireless devices, wherein the second sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector;
identifying a location of each of at least one of the plurality of wireless devices; and
selecting beamforming parameters of the beamforming pattern based at least on the location of the at least one of the plurality of wireless devices, wherein the selected beamforming parameters control at least a sector selection and the width of the beamforming pattern of the sector of the second sectorization base station.

8. The method of claim 7, further comprising:
broadcasting, by the second sectorization base station, streaming data through the selected sector of the sectorization base station.

9. The method of claim 8, wherein the at least one of the plurality of wireless devices simultaneously maintains a unicast wireless link with at least one of the plurality of cellular base stations, and receives the broadcast streaming data through the selected sector of the sectorization base station and receives the broadcast streaming data through the selected sector of the second sectorization base station.

10. A network comprising:
a plurality of cellular base stations providing wireless access for a plurality of wireless devices over a coverage area;
a sectorization base station providing wireless communication to the plurality of wireless devices over at least the coverage area, wherein the sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector;
a controller operative to:
identify locations of each of the plurality of wireless devices;
select beamforming parameters of the beamforming pattern based at least on the locations of the plurality of wireless devices and based on which of the plurality of wireless devices select to receive streaming data through the beamforming pattern, wherein the selected beamforming parameters control at least a sector selection and the width of the beamforming pattern of the sector.

11. The network of claim 10, wherein the sectorization base station further operates to broadcast the streaming data through the selected sector of the sectorization base station.

12. The network of claim 10, wherein the controller is further operative to identify a location of one or more of the plurality of wireless devices based on which of the plurality of cellular base stations the one or more of the plurality of wireless devices is maintaining a wireless link.

13. The network of claim 11, wherein at least one of the plurality of wireless devices simultaneously maintains a unicast wireless link with at least one of the plurality of cellular base stations and receives the broadcast streaming data through the selected sector of the sectorization base station.

14. The network of claim 11, wherein at least one of the cellular base stations or the sectorization base station advertises availability of the streaming data.

15. The network of claim 14, wherein at least one of the cellular base stations operates to receive a selection from one of more of the plurality of wireless devices to receive the streaming data.

16. The network of claim 10, further comprising:
a second sectorization base station, wherein the second sectorization base station operates to provide wireless communication to at least one of the plurality of wireless devices, wherein the second sectorization base station comprises a plurality of antennas operating to form a plurality of sectors, wherein each sector of the plurality of antennas operates to cover a selectable coverage area as determined by a width of a beamforming pattern formed by a subset of the plurality of antennas of the sector;
wherein the controller is further operative to:
identify a location of each of at least one of the plurality of wireless devices;
select beamforming parameters of the beamforming pattern based at least on the location of the at least one of the plurality of wireless devices, wherein the selected beamforming parameters control at least a sector selection and the width of the beamforming pattern of the sector of the second sectorization base station.

17. The network of claim 10, wherein the second sectorization base station operates to broadcast streaming data through the selected sector of the sectorization base station.

18. The network of claim 10, wherein the at least one of the plurality of wireless devices simultaneously maintains a unicast wireless link with at least one of the plurality of cellular base stations, and receives the broadcast streaming data through the selected sector of the sectorization base station and receives the broadcast streaming data through the selected sector of the second sectorization base station.

* * * * *